Patented July 26, 1932

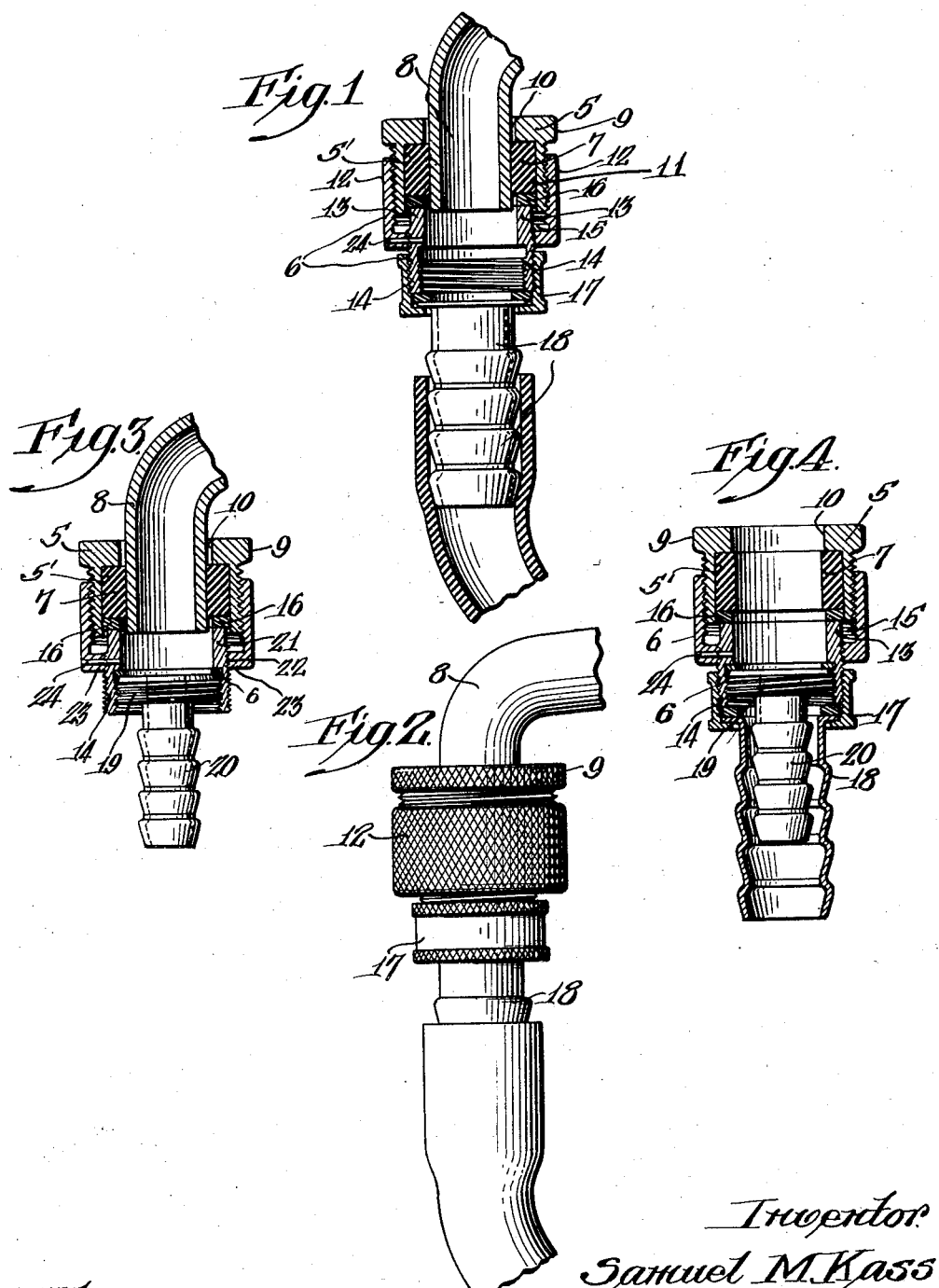

1,868,798

UNITED STATES PATENT OFFICE

SAMUEL M. KASS, OF PHILADELPHIA, PENNSYLVANIA

HOSE CONNECTION FOR FAUCETS

Application filed July 24, 1930. Serial No. 470,408.

My invention relates to a fitting for making hose connection to a smooth outlet, as of a faucet or the like.

A purpose of my invention is to provide a fitting of the character indicated adapted to easy and inexpensive manufacture and well suited to the needs of service.

A further purpose is to provide a fitting of the character indicated adapted to connect alternatively to larger or smaller sizes of hose.

A further purpose is to provide a coupling member for a small hose adapted to couple to a larger hose upon disconnecting the smaller hose.

A further purpose is to internally and externally thread the discharge end of the lower or nozzle member of a fitting of the character indicated,—externally threaded for connection with a standard internally threaded coupling of a relatively large hose and internally threaded to receive the externally threaded end of a terminal fitting for a relatively small hose.

A further purpose is to provide a compression clamp for a faucet outlet seal in which one clamp member contains an outer shell internally threaded and an annular stop for the compression material, with a recess between the stop and the shell and the second compression member is threaded into the shell and has room to extend into the recess.

A further purpose is to clamp a soft rubber washer between cooperating telescoping sleeves, the terminal sleeve having a counterbore and external thread from one end seating the washer in the counterbore and the cooperating sleeve presenting outer and inner annular portions respectively threading upon the terminal member and entering the counterbore, an annular recess between said portions being adapted to receive the end of the terminal member.

Further purposes will appear in the specification and in the claims.

I have elected to show one form only of my invention, selecting a form which is practical and efficient in operation and which well illustrates the principles involved.

Figure 1 is a longitudinal elevation partly sectioned, of structure embodying my invention and shown connecting a faucet to a relatively large hose.

Figure 2 is an outside elevation of structure shown in Figure 1.

Figure 3 is a view partly sectioned and partly in elevation, corresponding to a portion of Figure 1 but with one part shown in Figure 1 removed in Figure 3 for adaptation to connect to a smaller hose.

Figure 4 is a view corresponding to a portion of Figure 1 but with an outer nipple shown in elevation in Figure 1 sectioned in Figure 4 to disclose a smaller nipple optionally inside the outer nipple.

Like numerals refer to like parts in all figures.

Describing in illustration and not in limitation and referring to the drawing:—

My invention is directed to a combination fitting adapted to make a tight coupling with the smooth outlets of faucets or the like and to connect the outlet alternatively to either a larger or a smaller hose, securing a tight coupling at the outlet in either event.

In the illustration my fitting includes cooperating sleeves 5 and 6 that clamp a rubber washer 7 within a downwardly directed smooth counterbore 5' of the terminal fitting 5 against the smooth surface of the faucet outlet 8.

The terminal sleeve 5 is provided with a knurled flange 9, a central bore 10, adapted to readily pass the outlet 8 and a counterbore 11 to receive and seat the rubber washer 7.

The cooperating sleeve 6 includes coaxial upwardly directed outer and inner cylindrical portions 12 and 13 and a downwardly directed discharge portion 14.

The outer portion 12 is adjustably internally threaded over the downwardly directed end of the terminal sleeve 5 and the inner portion 13 suitably shorter than the outer portion is longitudinally alined with the counterbore of the terminal sleeve.

The cooperating sleeve 6 is provided with an annular recess 15 between the inner and outer portions, this recess permitting the inner portion 13 to telescope into the counterbore of the terminal sleeve when the outer portion is screwed over the terminal sleeve 5.

I show a follower ring 16 between the upwardly directed end of the inner portion 12 of the sleeve 6 and the bottom of the rubber washer 7.

By adjustably tightening the sleeves 5 and 6, the washer is compressed to any desired extent, tightly clamping the faucet outlet 8.

I provide the downwardly directed discharge end 14 of the member 6 with external and internal threading, using the external threading to make screw connection with a ring coupling member 17 that may be of a standard hose coupling 18 and the internal threading to receive a suitably externally threaded end 19 of a hose terminal 20; the fittings 18 and 20 being for connection respectively to a relatively large and a relatively small hose.

I prefer to supply the structure of Figure 4 as an assembled unit, the connection members 17 and 18 for the larger sized hose surrounding the connection 20 for the smaller sized hose.

It will many times be convenient to use the fitting as shown in Figure 3, the nozzle 20 normally carrying a small hose for any desired use, and when, at perhaps infrequent intervals, it is desired to connect the large hose to the outlet all that is necessary is to thread a standard coupling connection 18 over the external thread presented by the downwardly directed shank of the sleeve 6. Optionally the inner terminal member 20 may be taken out when using the connection to the larger hose.

I may make up the sleeve member 6 originally of two pieces, a nipple 21 externally and internally threaded from one end making thread connection at 22 with an inward flange of an outer nipple 23 that forms the upper outer portion of the member 6, the nipples 21 and 23 being held as a rigid unit by a suitable pin 24.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. An auxiliary faucet outlet member comprising an externally threaded outlet for hose connection beyond the faucet and a body having an internally threaded shell adapted to surround the faucet, an annular stop member inside and rigidly connected to the shell and leaving an annular recess between it and the internally threaded shell, a counterbored externally threaded clamping sleeve to screw into the shell and adapted to extend into the recess and a rubber seal in the counterbore fitting between the two members.

2. A fitting of the character indicated including a terminal sleeve having an external thread and a counterbore from one end, a resilient washer mounted in the counterbore and a cooperating sleeve having inner and outer portions, said outer portion threading over the said end of the terminal sleeve, said inner portion longitudinally alining with the counterbore and the sleeve having an annular recess alining with the said end of the terminal member permitting said end to telescope into the recess and connections adapting the second sleeve to connect to a hose.

3. In a fitting of the character indicated, a discharge nozzle having an internal bore to surround the outlet of a faucet having counterbores at each end presenting a radially outward shoulder before the bore and a radially outward shoulder beyond the bore and having internal and external threading upon its own counterbored outlet end in combination with a yielding washer and means connected to the nozzle for clamping the washer in the first counterbore upon the faucet and first shoulder.

4. A fitting of the character indicated including a terminal sleeve having an external thread and a counterbore from one end, a resilient washer mounted in the counterbore and a cooperating sleeve having coaxial inner and outer portions, said outer portion threading over the said end of the terminal sleeve, said inner portion longitudinally alining with the counterbore and the said cooperating sleeve having an annular recess alining with the said end of the terminal member permitting said end to telescope into the recess and said cooperating sleeve having its discharge end internally threaded to receive the externally threaded end of the terminal fitting for a small hose.

SAMUEL M. KASS.